US008480475B2

(12) United States Patent
Adiraju et al.

(10) Patent No.: US 8,480,475 B2
(45) Date of Patent: Jul. 9, 2013

(54) WAGERING GAME WITH MULTIPLE EPISODE-BASED BONUS GAMES

(75) Inventors: Srinivyasa M. Adiraju, Vernon Hills, IL (US); Allon G Englman, Chicago, IL (US); Joel R. Jaffe, Glenview, IL (US); Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 377 days.

(21) Appl. No.: 12/666,484

(22) PCT Filed: Jun. 24, 2008

(86) PCT No.: PCT/US2008/007893
§ 371 (c)(1), (2), (4) Date: Oct. 7, 2010

(87) PCT Pub. No.: WO2009/005657
PCT Pub. Date: Jan. 8, 2009

(65) Prior Publication Data

US 2011/0021260 A1 Jan. 27, 2011

Related U.S. Application Data

(60) Provisional application No. 60/937,504, filed on Jun. 28, 2007, provisional application No. 60/966,494, filed on Aug. 28, 2007.

(51) Int. Cl.
*A63F 13/00* (2006.01)

(52) U.S. Cl.
USPC .............................................. 463/20; 463/23

(58) Field of Classification Search
USPC ......................................... 463/20, 16, 23, 29
See application file for complete search history.

(56) References Cited

U.S. PATENT DOCUMENTS

| | | | | |
|---|---|---|---|---|
| 4,752,068 A | 6/1988 | Endo | ................................ | 273/1 |
| 5,575,474 A | 11/1996 | Rossides | ......................... | 463/26 |

(Continued)

FOREIGN PATENT DOCUMENTS

| | | |
|---|---|---|
| WO | WO 9929381 | 6/1999 |
| WO | WO 2005082480 A1 | 9/2005 |

(Continued)

OTHER PUBLICATIONS

Examiner's First Report corresponding to Australian Patent Application No. 2008271189, Australian Patent Office; dated Aug. 30, 2010; 2 pages.

(Continued)

*Primary Examiner* — Arthur O. Hall
*Assistant Examiner* — Allen Chan
(74) *Attorney, Agent, or Firm* — Nixon Peabody LLP

(57) ABSTRACT

A gaming machine for playing an episodic wagering game includes a game display and a controller. The game display is operable to display a randomly selected outcome of an episodic wagering game in response to receiving a wager from a player. The display further displays creative material content in one or more episodes of the episodic wagering game. The controller is in communication with the game display and is programmable to provide an award based on the randomly selected outcome and, in response to collecting a predetermined number of game items in one or more of the game episodes, cause the display of new creative material content of the wagering game without affecting the expected value of the episodic wagering game.

20 Claims, 7 Drawing Sheets

U.S. PATENT DOCUMENTS

| | | | | |
|---|---|---|---|---|
| 5,609,525 | A | 3/1997 | Ohno et al. | 463/43 |
| 5,833,537 | A | 11/1998 | Barrie | 463/21 |
| 5,957,775 | A | 9/1999 | Cherry | 463/16 |
| 6,004,211 | A | 12/1999 | Brenner et al. | 463/40 |
| 6,012,045 | A | 1/2000 | Barzilai et al. | 705/37 |
| 6,012,983 | A | 1/2000 | Walker et al. | 463/20 |
| 6,015,344 | A | 1/2000 | Kelly et al. | 463/16 |
| 6,068,553 | A | 5/2000 | Parker | 463/27 |
| 6,077,163 | A | 6/2000 | Walker et al. | 463/26 |
| 6,113,098 | A | 9/2000 | Adams | 273/143 |
| 6,165,071 | A | 12/2000 | Weiss | 463/24 |
| 6,234,896 | B1 | 5/2001 | Walker et al. | 463/16 |
| 6,254,481 | B1 | 7/2001 | Jaffe | 463/20 |
| 6,273,820 | B1 | 8/2001 | Haste, III | 463/40 |
| 6,302,790 | B1 | 10/2001 | Brossard | 463/20 |
| 6,311,976 | B1 | 11/2001 | Yoseloff et al. | 273/138.2 |
| 6,319,127 | B1 | 11/2001 | Walker et al. | 463/26 |
| 6,364,765 | B1 | 4/2002 | Walker et al. | 463/16 |
| 6,364,766 | B1 | 4/2002 | Anderson et al. | 463/16 |
| 6,365,765 | B1 | 4/2002 | Baldwin et al. | 556/440 |
| 6,431,983 | B2 | 8/2002 | Acres | 463/25 |
| 6,506,117 | B2 | 1/2003 | DeMar et al. | 463/20 |
| 6,506,118 | B1 | 1/2003 | Baerlocher et al. | 463/25 |
| 6,554,704 | B2 * | 4/2003 | Nicastro et al. | 463/20 |
| 6,663,489 | B2 | 12/2003 | Baerlocher | 463/20 |
| 6,722,981 | B2 | 4/2004 | Kaminkow et al. | 463/25 |
| 6,722,985 | B2 | 4/2004 | Criss-Puszkiewicz et al. | 463/29 |
| 6,745,236 | B1 | 6/2004 | Hawkins et al. | 709/218 |
| 6,758,757 | B2 | 7/2004 | Luciano, Jr. et al. | 463/43 |
| 6,776,713 | B2 | 8/2004 | Gauselmann | 463/16 |
| 6,780,111 | B2 | 8/2004 | Cannon et al. | 463/25 |
| 6,800,027 | B2 | 10/2004 | Giobbi et al. | 463/24 |
| 6,811,486 | B1 | 11/2004 | Luciano, Jr. | 463/24 |
| 6,923,721 | B2 | 8/2005 | Luciano et al. | 463/24 |
| 6,960,136 | B2 | 11/2005 | Joshi et al. | 463/25 |
| 7,182,690 | B2 | 2/2007 | Giobbi et al. | 463/24 |
| 2001/0024971 | A1 | 9/2001 | Brossard | 463/30 |
| 2002/0028708 | A1 | 3/2002 | Busch et al. | 463/42 |
| 2002/0039919 | A1 | 4/2002 | Joshi et al. | 463/20 |
| 2002/0077173 | A1 | 6/2002 | Luciano et al. | 463/25 |
| 2002/0077174 | A1 | 6/2002 | Luciano et al. | 463/25 |
| 2002/0093136 | A1 | 7/2002 | Moody | 273/139 |
| 2002/0094871 | A1 | 7/2002 | Luciano, Jr. et al. | 463/42 |
| 2002/0107065 | A1 | 8/2002 | Rowe | 463/20 |
| 2002/0151349 | A1 | 10/2002 | Joshi | 463/20 |
| 2002/0196342 | A1 | 12/2002 | Walker et al. | 463/20 |
| 2003/0013515 | A1 | 1/2003 | Rowe et al. | 463/25 |
| 2003/0013531 | A1 | 1/2003 | Rowe et al. | 463/42 |
| 2003/0036422 | A1 | 2/2003 | Baerlocher et al. | 463/20 |
| 2003/0036427 | A1 | 2/2003 | Brandstetter et al. | 463/29 |
| 2003/0064794 | A1 | 4/2003 | Mead et al. | 463/25 |
| 2003/0078101 | A1 | 4/2003 | Schneider et al. | 463/42 |
| 2003/0100362 | A1 | 5/2003 | Horniak et al. | 463/25 |
| 2003/0106769 | A1 | 6/2003 | Weiss | 194/201 |
| 2003/0114219 | A1 | 6/2003 | McClintic | 463/25 |
| 2003/0114220 | A1 * | 6/2003 | McClintic | 463/25 |
| 2003/0119579 | A1 | 6/2003 | Walker et al. | 463/20 |
| 2003/0157979 | A1 | 8/2003 | Cannon et al. | 463/16 |
| 2003/0195024 | A1 | 10/2003 | Slattery | 463/9 |
| 2003/0211881 | A1 | 11/2003 | Walker et al. | 463/20 |
| 2004/0053680 | A1 | 3/2004 | Schultz | 463/20 |
| 2004/0142742 | A1 | 7/2004 | Schneider et al. | 463/25 |
| 2005/0003886 | A1 | 1/2005 | Englman et al. | 463/25 |
| 2005/0054404 | A1 * | 3/2005 | Baerlocher | 463/9 |
| 2005/0159207 | A1 | 7/2005 | Thomas | 463/20 |
| 2006/0068893 | A1 | 3/2006 | Jaffe et al. | 463/20 |
| 2006/0079316 | A1 | 4/2006 | Flemming et al. | 463/25 |
| 2006/0079317 | A1 | 4/2006 | Flemming et al. | 463/25 |
| 2006/0084495 | A1 | 4/2006 | Jaffe et al. | 463/20 |
| 2006/0084496 | A1 | 4/2006 | Jaffe et al. | 463/20 |
| 2006/0089194 | A1 | 4/2006 | Joshi et al. | 463/25 |
| 2006/0160620 | A1 * | 7/2006 | Matthews et al. | 463/42 |
| 2007/0021183 | A1 | 1/2007 | Fiden et al. | 463/17 |
| 2007/0259706 | A1 | 11/2007 | Anderson et al. | 463/16 |
| 2007/0259713 | A1 | 11/2007 | Fiden et al. | 463/25 |
| 2007/0265060 | A1 | 11/2007 | Hornik et al. | 463/20 |
| 2007/0298856 | A1 | 12/2007 | Gilmore et al. | 463/16 |
| 2008/0113770 | A1 | 5/2008 | Gelber et al. | 463/25 |
| 2008/0113809 | A1 * | 5/2008 | David et al. | 463/42 |
| 2008/0235323 | A1 | 9/2008 | Block | 709/201 |
| 2008/0274814 | A1 | 11/2008 | Gagner et al. | 463/43 |
| 2008/0293473 | A1 | 11/2008 | Fiden et al. | 463/16 |
| 2008/0293478 | A1 | 11/2008 | Anderson et al. | 463/25 |
| 2008/0300046 | A1 | 12/2008 | Gagner et al. | 463/25 |
| 2008/0300049 | A1 | 12/2008 | Anderson et al. | 463/25 |
| 2009/0036196 | A1 | 2/2009 | Ansari et al. | 463/20 |
| 2009/0054136 | A1 | 2/2009 | Gagner et al. | 463/25 |
| 2009/0156299 | A1 | 6/2009 | Anderson et al. | 463/25 |
| 2009/0170593 | A1 | 7/2009 | Pacey | 463/25 |
| 2009/0170596 | A1 | 7/2009 | Gagner et al. | 463/25 |
| 2009/0291731 | A1 | 11/2009 | Jaffe et al. | 463/16 |
| 2009/0298577 | A1 | 12/2009 | Gagner et al. | 463/25 |

FOREIGN PATENT DOCUMENTS

| | | | |
|---|---|---|---|
| WO | WO 2006002241 | A2 | 1/2006 |
| WO | WO 2006004831 | A2 | 1/2006 |
| WO | WO 2006004832 | A2 | 1/2006 |
| WO | WO 2006005073 | A2 | 1/2006 |
| WO | WO 2006017036 | A1 | 2/2006 |
| WO | WO 2006017067 | A1 | 2/2006 |
| WO | WO 2006017068 | A1 | 2/2006 |
| WO | WO 2006020811 | A2 | 2/2006 |
| WO | WO 2006026250 | A2 | 3/2006 |
| WO | WO 2006044252 | A2 | 4/2006 |
| WO | WO 2006119070 | A1 | 11/2006 |
| WO | WO 2006128019 | A2 | 11/2006 |
| WO | WO 2007011636 | A2 | 1/2007 |
| WO | WO 2007013970 | A1 | 2/2007 |
| WO | WO 2007022256 | A2 | 2/2007 |
| WO | WO 2007032916 | A1 | 3/2007 |
| WO | WO 2007098017 | A2 | 8/2007 |
| WO | WO 2007098225 | A2 | 8/2007 |
| WO | WO 2007/103054 | A2 | 9/2007 |
| WO | WO 2007130464 | A2 | 11/2007 |
| WO | WO 2007146177 | A2 | 12/2007 |
| WO | WO 2008005298 | A2 | 1/2008 |
| WO | WO 2008008325 | A2 | 1/2008 |
| WO | WO 2008024349 | A2 | 2/2008 |
| WO | WO 2008030271 | A2 | 3/2008 |
| WO | WO 2008/048634 | A2 | 4/2008 |
| WO | WO 2008057191 | A2 | 5/2008 |
| WO | WO 2008057323 | A2 | 5/2008 |
| WO | WO 2008060517 | A2 | 5/2008 |
| WO | WO 2008063349 | A2 | 5/2008 |
| WO | WO 2008063393 | A2 | 5/2008 |
| WO | WO 2008097470 | A2 | 8/2008 |
| WO | WO 2008118318 | A1 | 10/2008 |
| WO | WO 2008121363 | A1 | 10/2008 |
| WO | WO 2008133850 | A1 | 11/2008 |
| WO | WO 2008143843 | A2 | 11/2008 |
| WO | WO 2008143845 | A1 | 11/2008 |
| WO | WO 2008156596 | A1 | 12/2008 |
| WO | WO 2009005578 | A2 | 1/2009 |
| WO | WO 2009006083 | A1 | 1/2009 |
| WO | WO 2009011832 | A2 | 1/2009 |
| WO | WO 2009017591 | A2 | 2/2009 |
| WO | WO 2009029271 | A1 | 3/2009 |
| WO | WO 2009038638 | A1 | 3/2009 |
| WO | WO 2009051637 | A1 | 4/2009 |
| WO | WO 2009058240 | A1 | 5/2009 |
| WO | WO 2009061365 | A1 | 5/2009 |
| WO | WO 2009061457 | A1 | 5/2009 |
| WO | WO 2009061476 | A1 | 5/2009 |
| WO | WO 2009061479 | A1 | 5/2009 |
| WO | WO 2009061634 | A1 | 5/2009 |
| WO | WO 2009061696 | A1 | 5/2009 |
| WO | WO 2009062201 | A1 | 5/2009 |
| WO | WO 2009091676 | A1 | 7/2009 |
| WO | WO 2009097538 | A1 | 8/2009 |
| WO | WO 2009123972 | A2 | 10/2009 |

OTHER PUBLICATIONS

Examiner's Second Report corresponding to Australian Patent Application No. 2008271189, Australian Patent Office; dated Jan. 12, 2011; 2 pages.

Notice of Acceptance corresponding to Australian Patent Application No. 2008271189, Australian Patent Office; dated May 10, 2011; 1 page.
International Preliminary Report on Patentability corresponding to PCT/US2008/007893, United States Patent Office, dated Jul. 22, 2009; 6 pages.
PCT International Search Report for International Application No. PCT/US2008/007893 dated Sep. 28, 2008 (2 pages).
PCT International Written Opinion for International Application No. PCT/US2008/007893 dated Sep. 28, 2008 (5 pages).

* cited by examiner

WAGERING GAME WITH MULTIPLE EPISODE-BASED BONUS GAMES

CROSS REFERENCE TO RELATED APPLICATIONS

This application is a U.S. national stage of International Application No. PCT/US2008/007893, titled "Wagering Game With Multiple Episode-Based Bonus Games" and filed Jun. 24, 2008, which claims priority to U.S. Provisional Patent Application Ser. No. 60/937,504, titled "Wagering Game With Multiple Episode-Based Bonus Games" and filed on Jun. 28, 2007, and to U.S. Provisional Patent Application Ser. No. 60/966,494, titled "Wagering Game With Multiple Episode-Based Bonus Games" and filed on Aug. 28, 2007, each of which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a method for unlocking content in response to accruing items when playing a multiple-episode wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

One type of wagering game is an episodic wagering game in which the game play progresses through a plurality of game episodes. One problem with some current episodic wagering games is that the player does not experience a continuous feeling of achievement when progressing through one or more of the game episodes. For example, the player is likely to lose interest in the game when the sole objective of the game is to receive an award, when a winning outcome is achieved, or to merely play through any episode of the wagering game.

To maintain the player's interest in the game, some players can be motivated by being awarded a random bonus award. One problem with this type of award is that it fails to provide a continuous motivation for the player. For example, even though the player may temporarily experience a feeling of excitement when receiving the bonus award, the feeling will likely fade away quickly after the bonus award is awarded. Furthermore, awarding bonus awards too often is not a satisfactory solution because it affects the expected value ("EV") of the gaming machine. Changing the EV of the gaming machine can have adverse effects, including reducing a gaming establishment's profit.

Accordingly, a need exists for a multiple-episode wagering game having an objective that does not affect the EV of the gaming machine. The present invention is directed to satisfying one or more of these needs and solving other problems.

SUMMARY OF THE INVENTION

According to one embodiment, a gaming machine for playing an episodic wagering game includes a game display and a controller. The game display is operable to display a randomly selected outcome of an episodic wagering game in response to receiving a wager from a player. The display further displays creative material content in one or more episodes of the episodic wagering game. The controller is in communication with the game display and is programmable to provide an award based on the randomly selected outcome and, in response to collecting a predetermined number of game items in one or more of the game episodes, cause the display of new creative material content of the wagering game without affecting the expected value of the episodic wagering game.

According to another embodiment, a method of conducting a wagering game includes receiving a wager input from a player for playing a wagering game having an episodic game-play progression that includes visual game content. The method further includes selecting at least one randomly selected outcome of a plurality of outcomes in response to receiving the wager input. In response to a predetermined player achievement, new visual game content is unlocked. The new visual game content does not affect an expected value of the wagering game.

According to yet another embodiment, a method for playing an episodic wagering game includes receiving a wager input from a player for playing an episodic wagering game having an episodic game-play progression. The method further includes selecting at least one randomly selected outcome of a plurality of outcomes, in response to receiving the wager input, and playing a first game episode. In response to accruing a number of player achievements while playing the first game episode, the first game episode is completed. In response to completing the first game episode, a second game episode is unlocked without affecting the expected value of the episodic wagering game.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
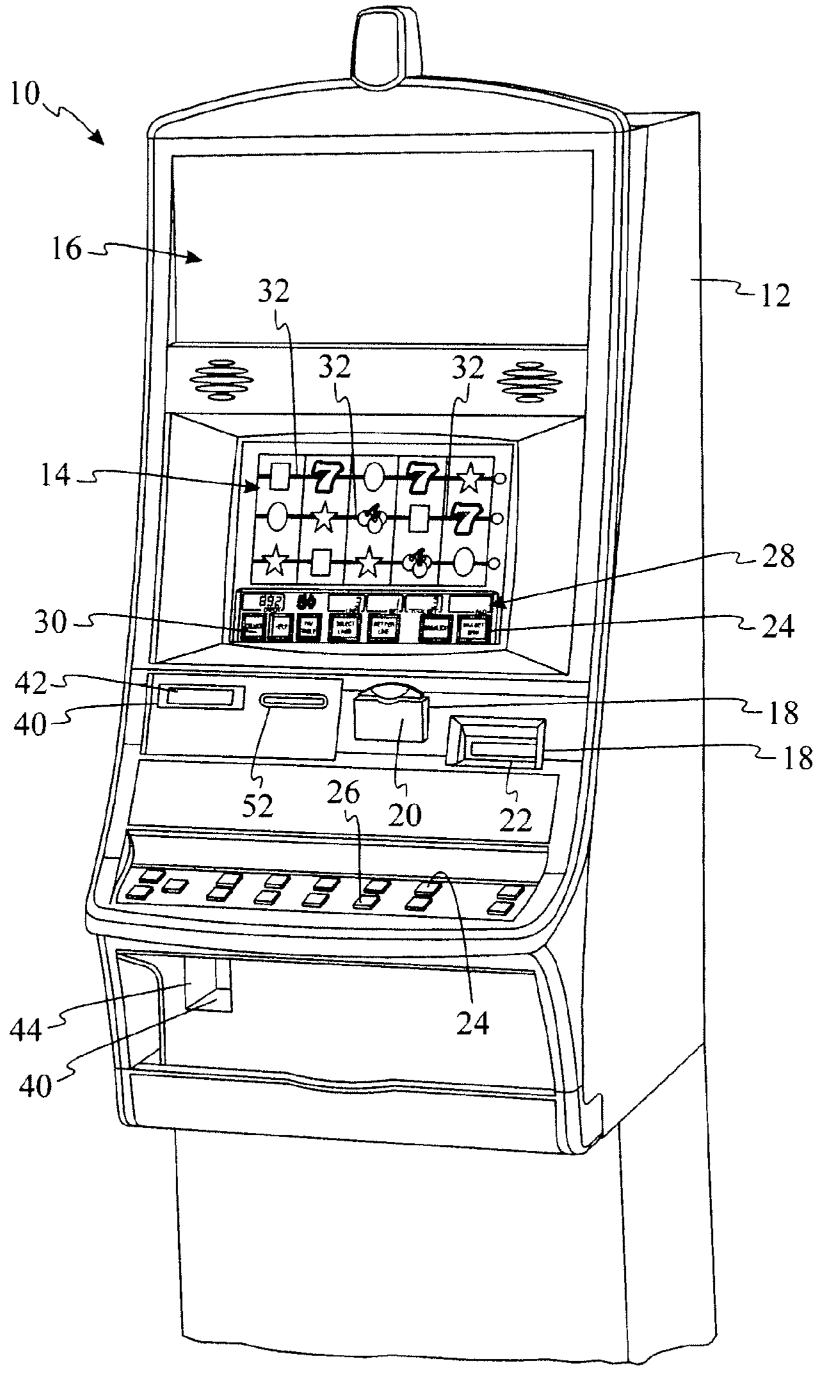
FIG. 1A is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
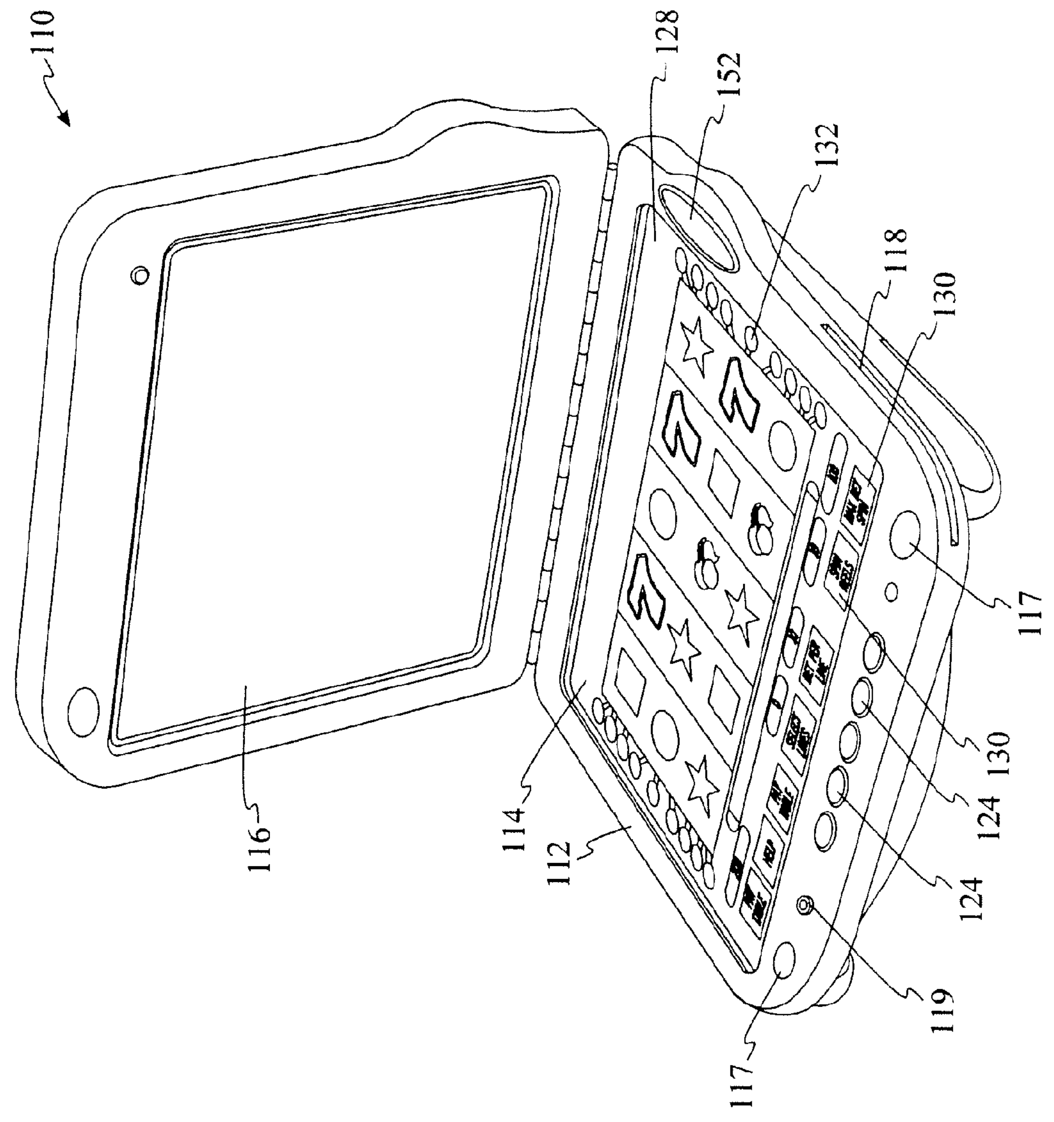
FIG. 1B is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game.

The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
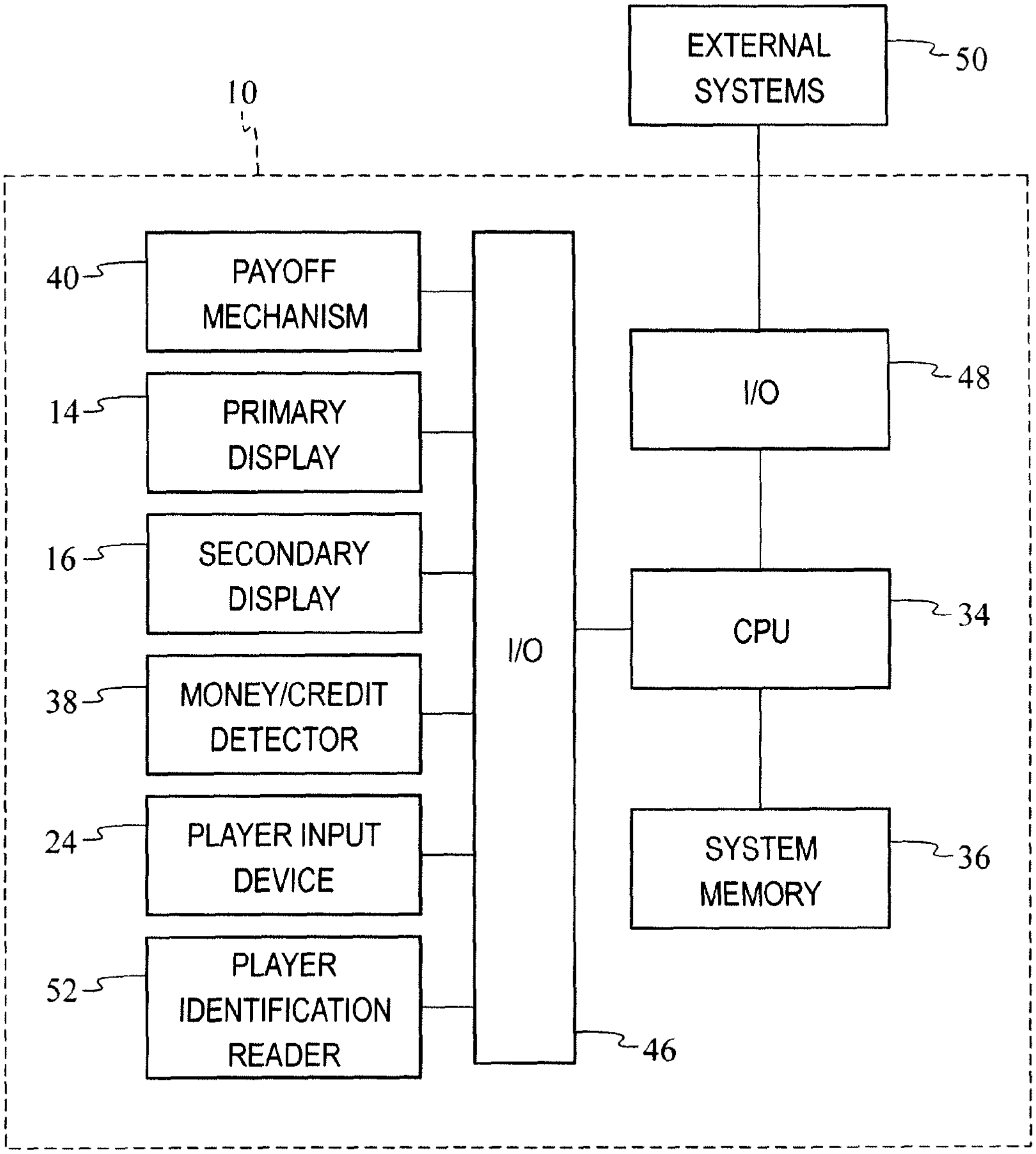
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

The wagering game played on the gaming machine 10, 110 is conducted in accordance with basic gaming rules that are familiar to a typical player. For example, the player may play a slots game in which the basic gaming rules provide a slots game that is played via five spinning reels. The player may conduct a slots game in which the randomly selected outcome is indicated via a plurality of predetermined symbols, such as cherry, lemon, orange, apple, and banana symbols. The player may conduct a slots game in which winning combinations are indicated to the player in a paytable, and in which the player can select a maximum of ten left-to-right paylines. Thus, before playing the slots game, the player has a general expectancy that the slots game will be played according to the respective set of basic gaming rules.

Figure 3:
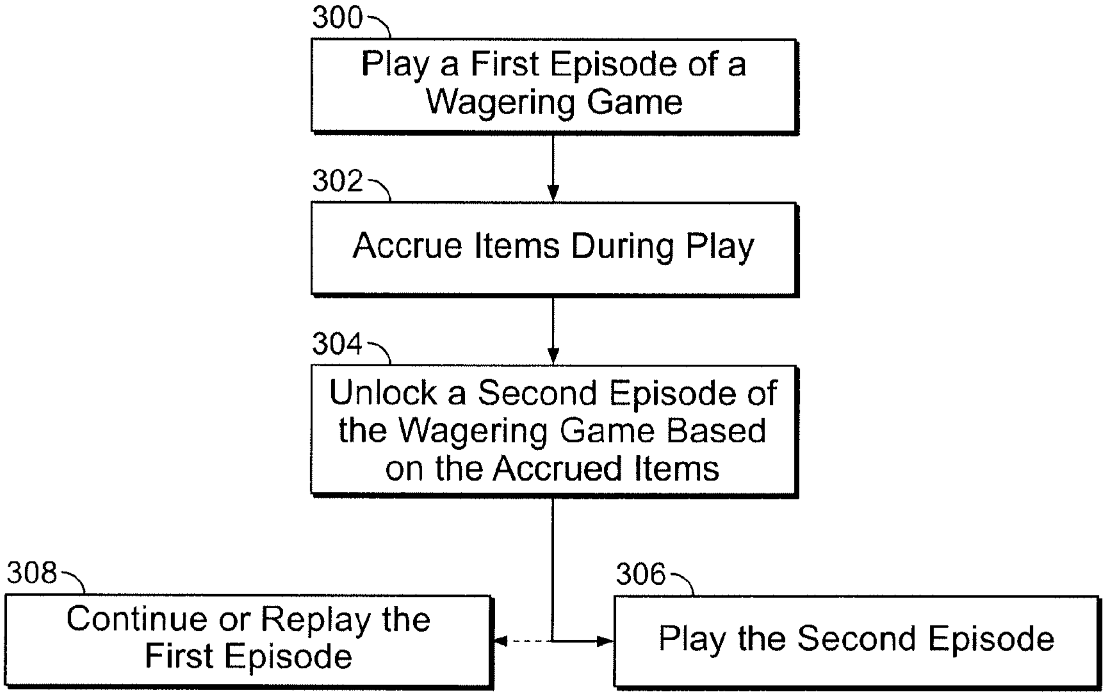
FIG. 3 is a general schematic representation of conducting an episodic wagering game, according to one embodiment.

Referring to FIG. 3, a player conducts an episodic wagering game in which the player can accrue items during game-play to unlock visual content of the wagering game. For example, the player can accrue an item when the player reaching a milestone, when a bonus game is triggered, etc. Episodic game-play can provide a fun experience, loyalty, and replayability when a player explores episodes of the wagering game. Generally, a game episode can be described as a distinct game-play portion (e.g., certain number of spins of the reels) of a wagering game that begins when a start-episode event is triggered and ends when an end-episode condition is reached. For example a start-episode event can be the receiving of a wager input from the player and selecting a start point of the respective game episode. An end-episode condition can occur, for example, when a wagering session is terminated (e.g., cashing-out) or when all game play requirements associated with the respective game episode are fulfilled.

The game episode is part of a game-play progression that includes a plurality of game episodes, wherein an end of an episode triggers the beginning of another episode. Generally, the game-play progression is linear, such that the player is required to complete a first episode before being able to play a second episode (in contrast to being able to play a third episode). Alternatively, the game-play progression can be non-linear (i.e., after completing a first episode the player is able to play any of a second episode or a third episode).

At least one of the game episodes can include a plurality of game features, also referred to as missions. The game features can include basic games and/or bonus games. For example, a game feature can be a reel spin in which one or more game-enhancement parameters are applied to the reels (e.g., wild reels, spin multipliers, multiplying wilds, wild symbols, etc.). To complete a particular game episode, the player may be required to play one or more of the game features. Optionally, the player may be required to play all the game features of a respective game episode before completing the game episode.

The player begins playing a first episode of the wagering game (300) and accrues, or collects, one or more items (302) during game-play. The accrued items can be any player achievements, including player medals, player ranks, player credits, etc. In response to the player accruing a predetermined number of items, creative material content of the wagering game is unlocked. Creative material content is visual content of the wagering game that does not affect the expected value of the gaming machine. As such, the creative material content does not yield a substantially different award value or a potentially greater or lesser award value. Some examples of creative material content are game episodes and game themes. For example, as shown in FIG. 3, the player can unlock a second episode of the wagering game (304). Similarly, the player can unlock a first theme of a first game episode (e.g., STAR TREK™ theme) and a second theme of the first game episode (e.g., TOP GUN™ theme).

The player can, optionally, unlock the second episode before actually completing the first episode. Thus, if the player has accrued enough items, the player can play the second episode (306) even if he or she has not completed the first episode. Alternatively, after reaching a particular threshold of accrued items (e.g., collecting "10" medals), the player can continue or replay the first episode (308). After unlocking the second episode, or any other content, a selection menu is available to the player at any time during game-play for selecting and playing the second episode. For example, if the player loses interest in playing the first episode, the player can use an unlocked-content menu to select the second episode.

Figure 4:
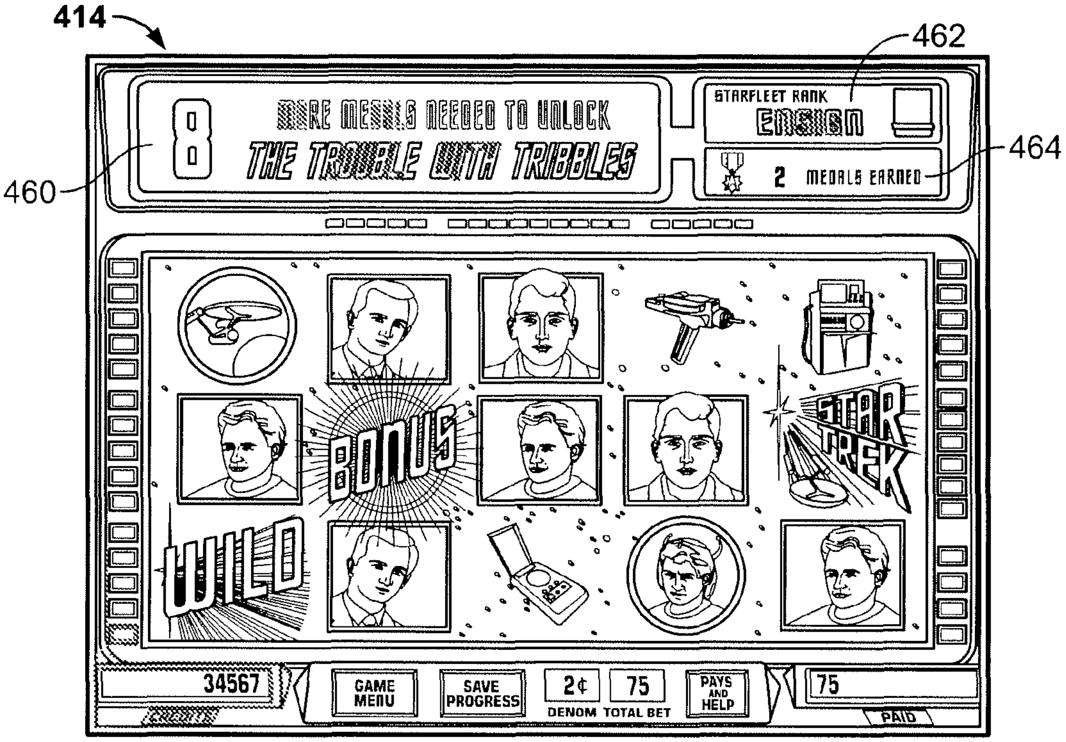
FIG. 4 is a representation of a display illustrating a game screen in which a player is required to collect a number of medals for unlocking a game episode.

Referring to FIG. 4, a player is presented with a first episode (e.g., "Explore New Worlds") of a STAR TREK™ themed episodic wagering game on a primary display 414. The first episode is generally presented if it is the player's first time playing the episodic wagering game or the player has not unlocked other wagering games or episodes.

A login screen for a user account allows the player to be identified and to determine the player's achievements, including rank, medals collected, episodes unlocked, etc. The login screen includes, for example, an "Existing Player" option and a "Create A New Login" option. If the player selects the "Existing Player" option, the player can retrieve accrued items that were saved during previous wagering sessions. Similarly, the "Existing Player" option may be used to save items accrued during a current wagering session. If the player chooses to create a new login, the player can use a screen keyboard to enter login information, such as a player username, a player password, a game character (e.g., a STAR TREK™ crew member), etc. Player account information may be replicated to other gaming establishments via a wide area network.

Optionally, the player is prompted to create the user account the first time a bonus game is triggered, when the player has zero credits, or at cash-out. After creating the user account, the player has an option to print a reminder ticket containing information regarding the user account. For example, the reminder ticket may include a user identification (i.e., a user ID), a bar code (e.g., a 14-digit bar code related to an account number), etc. To ensure player anonymity and fairness, the only information stored on the ticket may only include the player self-created ID.

The player may have several options when using the user account. For example, instead of manually retyping the login information, the player may use the ticket to login during subsequent gaming sessions. After the ticket is read, during login, the ticket is returned to the player. In another example, the player may select a cash-out option to automatically log out from the user account. In yet another example, multiple players may share the same login.

According to an alternative embodiment, when the wagering game reaches zero credits, a message screen appears and offers the player a chance to insert more money or logout of the user account. The message screen may have a timeout period, e.g., 15-30 seconds, if the player does not respond.

The primary display 414 includes an achievement requirement notification 460, a current rank notification 462, and a current medal notification 464. The achievement requirement notification 460 indicates to the player that he or she must collect "8" additional medals to unlock an episode titled "The Trouble With Tribbles." Currently, the player has an "Ensign" rank (as indicated by the current rank notification 462) and has collected (or earned) " "2 medals (as indicated by the current medal notification 464). Thus, the player is required to collect a total of "10" medals to unlock the episode titled "The Trouble With Tribbles."

Figure 5:
FIG. 5 is a representation of a display illustrating an announcement that an episode is unlocked.

Referring to FIG. 5, the wagering game indicates that the first episode (e.g., Episode 1, titled "Explore New Worlds") has been completed and that a next episode has been unlocked and is now available for game-play. To unlock the episode "Explore New Worlds," the player has collected all "10" of the required medals. Although the medals do not provide any award benefit to the player, the player is able to obtain other non-award related benefits, including unlocking the next episode, increasing a player rank, etc. Thus, after collecting a predetermined number of medals, the player can unlock and play additional wagering games or episodes of the same wagering theme. After completing the first episode, the player can choose to play any unlocked episodes. Alternatively, the player may only be allowed to play the last X number of unlocked episodes or games. For example, the player may only be allowed to play the 3 most current unlocked episodes of the STAR TREK™ themed episodic wagering game.

Figure 6:
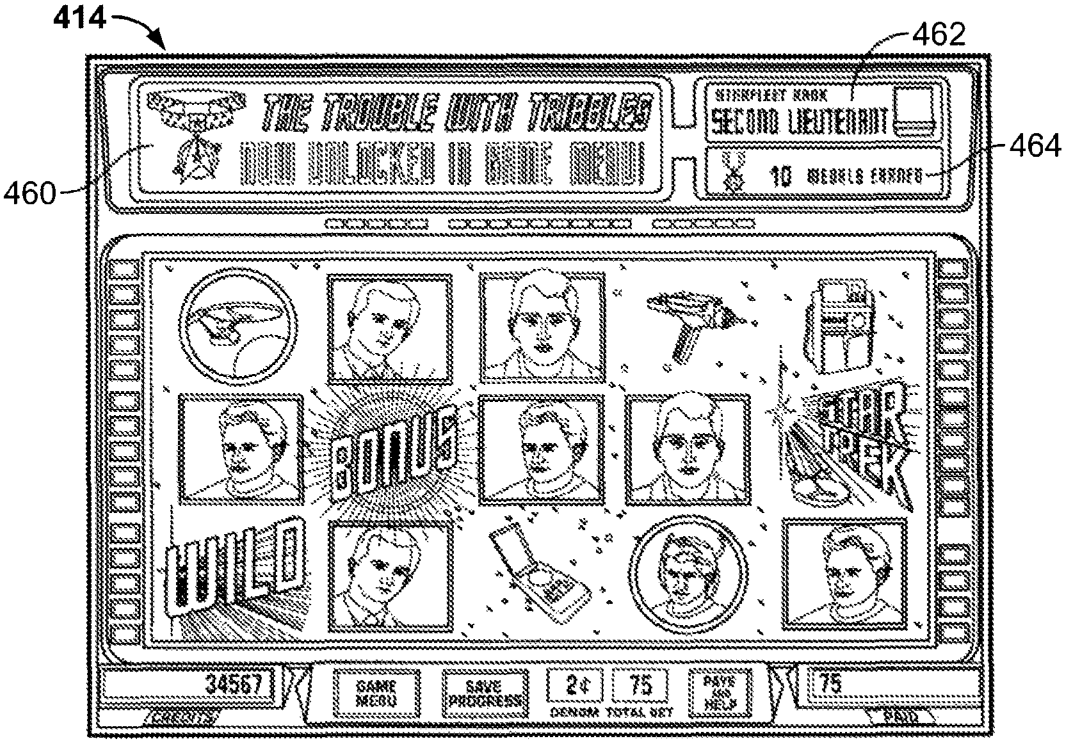
FIG. 6 is a representation of a display illustrating a game screen in which an episode is unlocked, according to another embodiment.

Referring to FIG. 6, the player can continue to play the first episode, "Explore New Worlds," even if the next episode, "The Trouble With Tribbles," has been unlocked and is available for game-play. The achievement requirement notification 460 indicates that "The Trouble With Tribbles" episode is unlocked in the game menu and the current medal notification indicates that "10" medals have been earned. Additionally, the player has now achieved the rank of "Second Lieutenant." The player's rank may increase as each new episode is unlocked (e.g., every "10" medals). Alternatively, the number of medals required to advance to a new rank increases or decreases as the player advances in rank. For example, the player may need more medals to advance to a "Captain" rank (e.g., "20" medals) or less medals (e.g., "5" medals).

Figure 7:
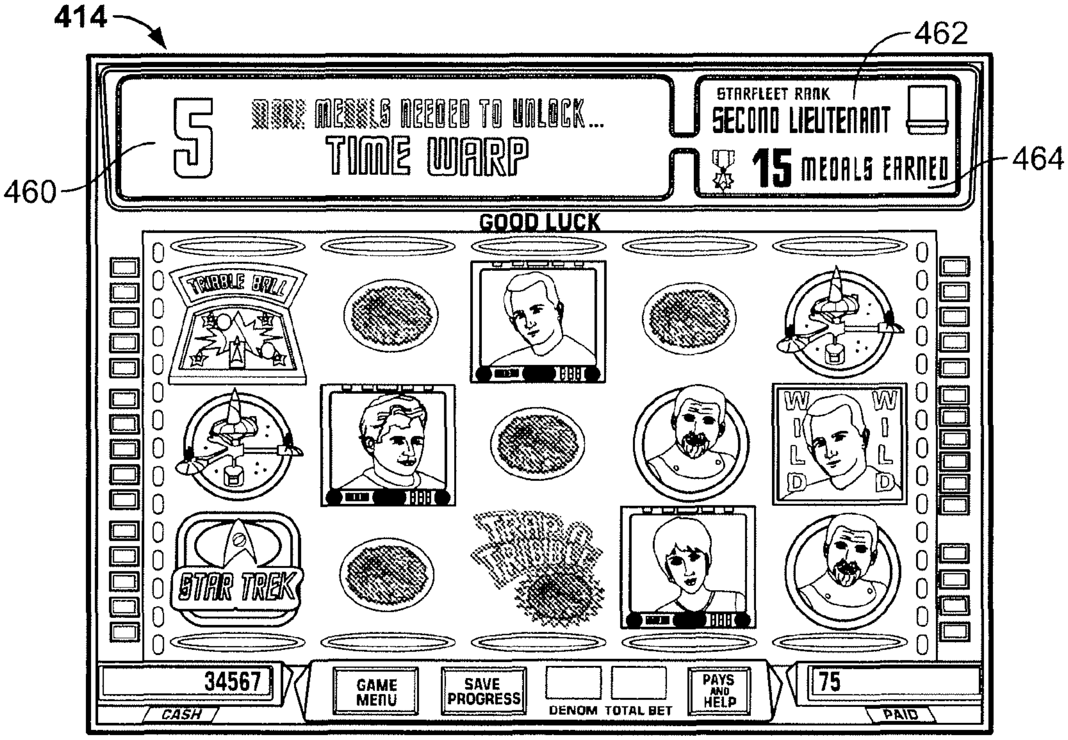
FIG. 7 is a representation of a display illustrating a game screen in which an announcement indicates a number of medals required to unlock additional game content.

Referring to FIG. 7, the primary display 414 shows a gamescreen of "The Trouble With Tribbles" episode. As indicated, the player has currently collected "15" medals (still having a rank of "Second Lieutenant"). If the player collects "5" more medals, he or she will unlock a third episode, titled "Time Warp," of the STAR TREK™ themed episodic wagering game.

Figure 8:
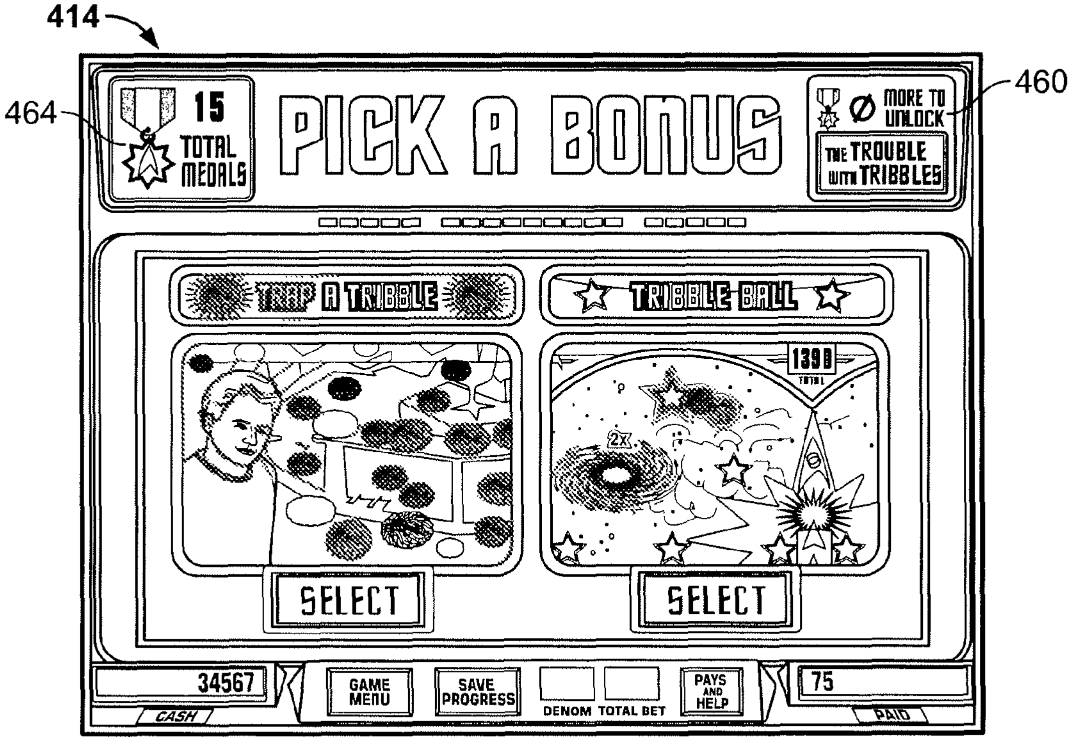
FIG. 8 is a representation of a display illustrating a bonus selection screen, according to another embodiment.

Referring to FIG. 8, the primary display 414 shows a screen for selecting two bonus games that are randomly triggered during the basic wagering game of the STAR TREK™ themed episodic wagering game. The current medal notification 464 (now shown on the left side of the primary display 414) indicates that the player still has only "15" total medals. The achievement requirement notification 460 (now shown on the right side of the primary display 414) indicates that the bonus games were triggered during the unlocked episode titled "The Trouble With Tribbles," for which the player does not need any more medals (i.e., "0" medals required). The player is requested to select one bonus game from a first bonus game, "Trap A Tribble" (which is a free-spin bonus game) and second bonus game, "Tribble Ball" (which is a pseudo-picking bonus game). Alternatively, the randomly triggered bonus games are additional episodes of the wagering game.

Figure 9:
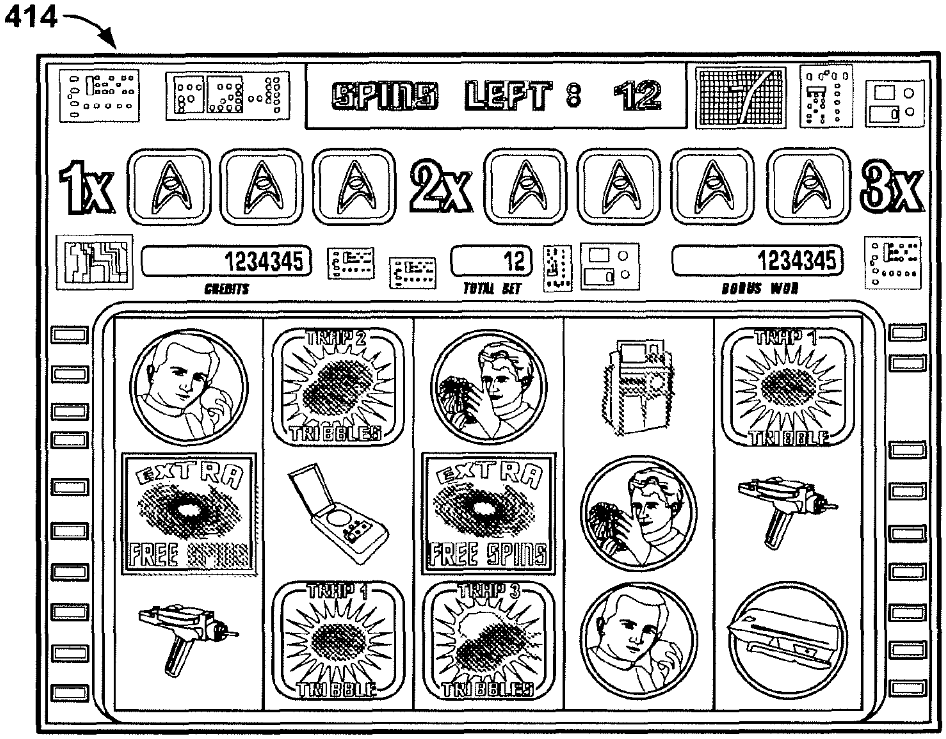
FIG. 9 is a representation of a display illustrating a bonus game-play screen.

Referring to FIG. 9, the player selects the first bonus game, "Trap A Tribble," in which symbols accumulate on top of a plurality of reels. If three tribbles are trapped on a winning spin, a "2×" multiplier is applied. If seven or more tribbles are trapped (as illustrated by the "TRAP×TRIBBLES" symbols, which show "TRAP 2 TRIBBLES"+"TRAP 1 TRIBBLE"+ "TRAP 3 TRIBBLES"+"TRAP 1 TRIBBLE"), a "3×" multiplier is applied to the winning combinations. The multiplier can be applied to a winning combination for the current spin, to all winning combinations for the current spin and a subsequent spin, or to all winning combinations until all the free spins are completed.

According to alternative embodiments, the player can unlock a different theme for the wagering game. For example, referring to the exemplary STAR TREK™ themed episodic wagering game, the player may play a default day theme of the STAR TREK™ theme in which all the reel symbols are brightly illuminated. As the player collects player achievements, such as medals, the player may unlock a night theme of the STAR TREK™ theme (in which all the reel symbols are dimly lit). Alternatively, the player may unlock an unrelated theme to the STAR TREK™ theme, such as a TOP GUN™ theme, a MONOPOLY™ theme, etc. Regardless of which theme is unlocked, the EV of the gaming machine remains unaffected.

According to another alternative embodiment, medals are automatically added to one or more players when a next (new) episode is released to the public. The medals are added based on any criteria. For example, the medals are added to all the players that have been actively playing the episodic game. The determination of whether a player has been actively playing can be based, for example, on how many games the player has completed, how much time the player has spent playing the episodic game, what percentage of the episodic game has the player completed, etc. The adding of the medals can be useful as a marketing tool, to increase player awareness of the episodic game, of a particular gaming establishment, of a particular machine, etc. Regardless of medals being automatically added, the EV of the gaming machine remains unaffected.

Game themes or episodes may be added to a wagering game at different times to increase anticipation of players and to provide a new gaming experience for the players. For example, at an initial wagering game installation, two of three game themes (e.g., "Explore New Worlds" and "The Trouble With Tribbles") may be installed on a flash card of STAR TREK™ themed game terminals. After a period of time, a third game theme (e.g., "Trek Through Time") may be installed. The installation of the third game theme is likely to increase enthusiasm of players for playing STAR TREK™ themed wagering games.

According to another alternative embodiment, a player receives a mystery bonus medal based on a predetermined criteria or on a random basis. The mystery bonus medal is likely to increase the excitement of the player in his or her progress towards a particular goal, such as collecting an "X" number of medals. The criteria for receiving the mystery bonus medal can be based, for example, on the player's success in the episodic game, the player's current number of medals, etc. For example, if the player has been playing for a long period of time (e.g., 4 hours) without being able to collect a single medal and the player is currently short one medal from unlocking a next episode, the player may receive the mystery bonus medal to increase the player's excitement and remove the likelihood that the player will become frustrated with the game by not being able to unlock the next episode.

According to another alternative embodiment, a player is "comped" for accrued items. Comping refers generally to offering of "comps" (e.g., complimentary items and services) by a gaming establishment for increasing and retaining the number of their customers. The purpose for using casino comps is to get the player to come back to the casino by promoting good will and by enticing player loyalty to a player rewards system. Comps can range from free items, such as hats and pens, to free services, such as valet parking and hotel stays. The player can redeem accrued items for casino comps. For example, the player can redeem 10 accrued medals for a buffet dinner.

Optionally, the player can receive a comp based on a combination of accrued items and accrued casino points. To participate in a casino comps program, the player generally signs up for a player rewards card and uses it when using a gaming machine. Based on the amount of gameplay, the player accumulates a certain number of casino points. In combination with accrued items, the accumulated casino points can be redeemed for specific comps. For example, the player, who has accrued 5 medals and 100 casino points, wants a free dinner. The dinner can be received in exchange for 150 points or 15 medals, wherein each medal is worth 10 points. The player can receive the free dinner by exchanging the 100 points and the 5 medals (which are worth a total of 50 points). Thus, accrued items can be exchanged for points and/or comps.

Optionally yet, instead of redeeming the accrued items, the player can receive a comp as a bonus for reaching a specific accrued-item criterion. For example, upon receiving the rank of lieutenant, the player may receive a complimentary dinner, and upon receiving the rank of general, the player may receive a complimentary hotel night at the hotel associated with the gaming establishment.

According to another alternative embodiment, accrued items are awarded via a server that automatically awards accrued items outside of gaming rules through a secondary set of casino-wide rules. For example, the server can automatically award 10 medals to anyone playing during generally slow time periods. Every player that plays on Tuesday mornings between 10 a.m. and 12 p.m. receives the medals. Alternatively, the accrued items are awarded at the discretion of a gaming establishment operator. For example, to increase player excitement, the operator may decide to award 5 medals to each player physically located in the gaming establishment. Optionally, items and/or comps are awarded based on a marketing and/or promotional campaign. Such marketing and promotions include marketing surveys, free gifts, promotional contests, vouchers, web promotions, partner services, sponsor points, in-game advertisements, special occasions, special event days, etc.

Each of these embodiments and obvious variations thereof is contemplated as falling within the spirit and scope of the claimed invention, which is set forth in the following claims.

What is claimed is:

1. A computer-implemented method of conducting an episodic wagering game on a wagering game system, the wagering game system including one or more input devices, one or more display devices, and one or more processors, the method comprising:

receiving, via at least one of the one or more input devices, a wager input from a player for playing an episodic wagering game having an episodic game-play progression, the episodic game-play progression including at least a first game episode with a first expected value and a second game episode with a second expected value, the first expected value and the second expected value being substantially equal;

selecting, via at least one of the one or more processors, at least one randomly selected outcome of a plurality of outcomes in response to receiving the wager input;

displaying, via at least one of the one or more display devices, the at least one randomly selected outcome;

playing the first game episode;

in response to accruing a number of player achievements while playing the first game episode, completing the first game episode;

in response to completing the first game episode, unlocking the second game episode; and in response to receiving another wager input from the player, via at least one of the one or more input devices, playing the second game episode.

2. The computer-implemented method of claim 1, wherein the first game episode and the second game episode have the same game theme.

3. The computer-implemented method of claim 1, further comprising unlocking, via at least one of the one or more processors, at least two types of player-selectable bonus games in response to accruing at least a portion of the number of player achievements.

4. The computer-implemented method of claim 1, further comprising displaying, via at least one of the one or more display devices, a selection menu for selecting any unlocked visual content, the selection menu being available to the player at any time during a wagering session after the visual content has been unlocked.

5. The computer-implemented method of claim 1, wherein the player achievements include one or more of a collection of player ranks or a collection of player medals.

6. The computer-implemented method of claim 1, wherein at least one of the player achievements is a mystery item awarded based on a predetermined criteria or on a random occurrence.

7. The computer-implemented method of claim 1, further comprising automatically adding at least one player achievement to the player when new visual game content is released, the adding of the at least one player achievement being based on a predetermined player criteria.

8. A gaming system configured to conduct a wagering game comprising:

one or more input devices;

one or more display devices;

one or more processors;

one or more memory devices storing instructions that, when executed by the at least one or more processors, cause the gaming system to:

receive an input, via the one or more input devices, indicative of a wager for playing an episodic wagering game having an episodic game-play progression, the episodic game-play progression including at least a first game episode with a first expected value and a second game episode with a second expected value, the first expected value and the second expected value being substantially equal;

select, via at least one of the one or more processors, at least one randomly selected outcome of a plurality of outcomes in response to receiving the wager input;

display, via at least one of the one or more display devices, the at least one randomly selected outcome;

in response to accruing a number of player achievements while playing the first game episode, complete the first game episode;

in response to completing the first game episode, unlock the second game episode; and in response to receiving another input from the player, via at least one of the one or more input devices, play the second game episode.

9. The gaming system of claim 8, wherein the first game episode and the second game episode have the same game theme.

10. The gaming system of claim 8, wherein the instructions further cause the gaming system to unlock, via at least one of the one or more processors, at least two types of player-selectable bonus games in response to accruing at least a portion of the number of player achievements.

11. The gaming system of claim 8, wherein the instructions further cause the gaming system to display, via at least one of the one or more display devices, a selection menu for selecting any unlocked visual content, the selection menu being available to the player at any time during a wagering session after the visual content has been unlocked.

12. The gaming system of claim 8, wherein the player achievements include one or more of a collection of player ranks or a collection of player medals.

13. The gaming system of claim 8, wherein at least one of the player achievements is a mystery item awarded based on a predetermined criteria or on a random occurrence.

14. The gaming system of claim 8, wherein the instructions further cause the gaming system to automatically add at least one player achievement to the player when new visual game content is released, the adding of the at least one player achievement being based on a predetermined player criteria.

15. One or more physical machine-readable non-transitory storage media including instructions which, when executed by one or more processors, cause the one or more processors to perform operations comprising:

receiving an input, via one or more input devices, indicative of a wager for playing an episodic wagering game having an episodic game-play progression, the episodic game-play progression including at least a first game episode with a first expected value and a second game episode with a second expected value, the first expected value and the second expected value being substantially equal;

selecting, via at least one of the one or more processors, at least one randomly selected outcome of a plurality of outcomes in response to receiving the wager input;

displaying, via one or more display devices, the at least one randomly selected outcome; in response to accruing a number of player achievements while playing the first game episode, completing the first game episode;

in response to completing the first game episode, unlocking the second game episode; and in response to receiving another input from the player, via at least one of the one or more input devices, playing the second game episode.

16. The one or more physical machine-readable non-transitory storage media of claim 15, wherein the first game episode and the second game episode have the same game theme.

17. The one or more physical machine-readable non-transitory storage media of claim 15, wherein the operations further comprise unlocking, via at least one of the one or more processors, at least two types of player-selectable bonus games in response to accruing at least a portion of the number of player achievements.

18. The one or more physical machine-readable non-transitory storage media of claim 15, wherein the operations further comprise displaying, via at least one of the one or more display devices, a selection menu for selecting any unlocked visual content, the selection menu being available to the player at any time during a wagering session after the visual content has been unlocked.

19. The one or more physical machine-readable non-transitory storage media of claim 15, wherein the player achievements include one or more of a collection of player ranks or a collection of player medals.

20. The one or more physical machine-readable non-transitory storage media of claim 15, wherein at least one of the player achievements is a mystery item awarded based on a predetermined criteria or on a random occurrence.

* * * * *

UNITED STATES PATENT AND TRADEMARK OFFICE

CERTIFICATE OF CORRECTION

PATENT NO. : 8,480,475 B2
APPLICATION NO. : 12/666484
DATED : July 9, 2013
INVENTOR(S) : Adiraju et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this
Eighth Day of September, 2015

Michelle K. Lee
*Director of the United States Patent and Trademark Office*